(12) United States Patent
Pohl et al.

(10) Patent No.: US 8,213,149 B2
(45) Date of Patent: Jul. 3, 2012

(54) LIFTING AND TRANSPORTING STACKS OF FERROMAGNETIC PLATES

(75) Inventors: Thomas Gerd Pohl, Duisburg (DE); Wilhelm Cassing, Werne (DE); Joachim Hoppen, Gelsenkirchen (DE); Falk Steger, Oberhausen (DE)

(73) Assignee: Thyssenkrupp Millservices & Systems GmbH, Oberhausen (DE)

( * ) Notice: Subject to any disclaimer, the term of this patent is extended or adjusted under 35 U.S.C. 154(b) by 384 days.

(21) Appl. No.: 12/689,398

(22) Filed: Jan. 19, 2010

(65) Prior Publication Data

US 2010/0201468 A1 Aug. 12, 2010

(30) Foreign Application Priority Data

Feb. 11, 2009 (DE) .......................... 10 2009 008 387

(51) Int. Cl.
*H01H 47/00* (2006.01)
*H01F 13/00* (2006.01)
(52) U.S. Cl. .......................... 361/144; 361/145; 361/147
(58) Field of Classification Search .................... 361/144
See application file for complete search history.

(56) References Cited

U.S. PATENT DOCUMENTS

| 4,647,268 | A |   | 3/1987 | Scholl |
| 5,355,042 | A | * | 10/1994 | Lewis et al. .................. 310/90.5 |
| 6,104,270 | A |   | 8/2000 | Elias |
| 6,208,051 | B1 | * | 3/2001 | Ando .......................... 310/90.5 |
| 7,738,232 | B2 | * | 6/2010 | Ito ................................. 361/152 |
| 7,800,334 | B2 | * | 9/2010 | Hamann et al. ............... 318/638 |

FOREIGN PATENT DOCUMENTS

| GB | 1068188 | 5/1967 |
| GB | 2043354 | 1/1979 |

* cited by examiner

*Primary Examiner* — Dharti Patel
(74) *Attorney, Agent, or Firm* — Andrew Wilford

(57) ABSTRACT

A stack of ferromagnetic sheets is gripped, lifted, and transported by first engaging with an uppermost sheet of the stack a plurality of magnet assemblies of a magnetic grab, each assembly having at least one electromagnet, then electrically energizing the electromagnets and lifting the stack with the grab while monitoring a magnetic flux of each electromagnet. A controller then compares the fluxes of the electromagnets, and varies the electrical energization of at least one of the electromagnets such that the fluxes of all the electromagnets are generally equal. The system has at least one flux sensor on each of the magnet assemblies and connected to the controller.

13 Claims, 3 Drawing Sheets

FIG. 3C"

LIFTING AND TRANSPORTING STACKS OF FERROMAGNETIC PLATES

FIELD OF THE INVENTION

The present invention relates to lifting and transporting a stack of ferromagnetic plates. More particularly this invention concerns a method of and apparatus for gripping, lifting, and transporting a plurality of stacked ferromagnetic plates.

BACKGROUND OF THE INVENTION

It is standard, for instance in a mill producing sheet steel, to transport a stack of plates by use of a magnetic grab. Such a grab is typically a powerful electromagnetic that is engaged with the topmost sheet of the stack and that is powerful enough to lift this top sheet and, through it, the remaining underlying sheets of the stack. Such magnetic grabs are also frequently used for other purposes, including of course lifting one-piece objects that are ferromagnetic, which term here is intended to cover any material capable of being attracted by a magnet. The advantage of such lifting is that it eliminates the need for moving parts and elements adapted to fit the workpiece or workpieces being moved, and can be made to grip when electrically energized and release when electrically de-energized.

More particularly when used to pick up ferromagnetic objects of large surface area such a system normally employ at least two more magnet assemblies in order to allow the magnetic holding forces necessary to act upon the ferromagnetic objects in a distributed manner across the surface of such ferromagnetic objects. To this end, the magnet assemblies usually each comprise two or more pole shoes by means of which a magnetic circuit can be closed through the ferromagnetic object being handled, thus resulting in a magnetic attractive force between the pole shoes and the at least one ferromagnetic object.

The magnetic grab may be configured, for example, in that it has a horizontal longitudinal beam carrying a plurality of transverse beams that are longitudinally equispaced. Respective magnet assemblies are mounted on the ends of the cross beams so that they form a rectangular array, although this is not always the case. Magnetic grabs deviating from this arrangement are also known, but normally have at least two magnet assemblies.

Magnet assemblies are also known in terms of their configuration in various embodiments. For example, magnet assemblies exist that are purely electromagnetic, therefore generating a holding force only when electrically energized. Thus, no magnetic holding force is generated by such magnet assemblies when not electrically energized si that such systems have the disadvantage of releasing their load in case of a power failure.

Hence, magnet assemblies are preferred that have a combination of permanent and electromagnets so that a magnetic field is constantly generated by a permanent magnet. There is therefore always some holding force.

In order to grip a ferromagnetic object without at the start applying any magnetic holding force to it, the magnetic holding force generated by the permanent magnet may be initially countered by electrically energizing the electromagnetic portion of such a magnet assembly to generate a magnetic force opposite that of the respective permanent magnet or magnets. The total magnetic holding force may then be particularly continuously increased by switching off or reducing the current applied, or optionally also by reversing the polarity of the applied current. Such a magnet assembly provides the advantage that even in case of power failure, and therefore in case of a loss of electromagnetic holding force, a holding force is still generated by the permanent-magnet element or elements of the magnet assembly.

It is known that the magnetic holding force substantially depends on the magnetic flux generated by a magnet assembly connected to the at least one ferromagnetic object. To this end, however, the magnetic flux and the magnetic holding force generated by means of the same are not identical in all magnet assemblies with the use of multiple magnet assemblies, even those having an identical construction and identical current feed of such magnet assemblies.

This is due to the fact that different magnetic resistances exist in the magnetic circuit generated between the magnet assembly and the at least one ferromagnetic object. The magnetic resistances may be influenced, for example, by air gaps, material qualities of the ferromagnetic objects or magnet assemblies to be lifted, temperatures of the ferromagnetic objects and the magnet assemblies, and particularly also on the surface structures of the at least one ferromagnetic object that may vary, for example, due to scaling, rust, coatings, unevenness, etc.

Particularly when gripping, lifting, and transporting a plurality of ferromagnetic objects, such as when gripping, lifting, and transporting a stack of flat sheets, these effects are amplified, as the above-described variables for each of the individual flat sheets contributing to the magnetic resistances are present individually.

Therefore, significant deviations between the individual holding forces of the magnet assemblies may occur during the gripping, lifting, and transporting of ferromagnetic objects, particularly if they are not compact, and particularly when gripping a stack of multiple flat sheets, most particularly if the magnet assemblies are not activated in an identical manner.

Another effect in flat sheets is that they do not stay planar after being gripped and lifted. More particularly, after gripping, that is when lifted and being transported, they usually bend, and the amount of bend increases when only a few of the magnetic grabs are used. Such bend is responsible for a significant reduction of the holding force, particularly due to an enlargement of the air gap between individual flat sheets.

This results in the risk in commonly used methods or systems for gripping, lifting, and transporting of ferromagnetic objects that the different magnetic holding forces applied by the magnet assemblies deviate from each other. As a result, some of the magnet assemblies fall short of a necessary minimum holding force may be present, and a ferromagnetic object being carried may be dropped. Particularly when gripping, lifting, and transporting a stack of flat sheets the lowermost sheet may bend and drop off because of the locally different holding forces of the magnet assemblies.

OBJECTS OF THE INVENTION

It is therefore an object of the present invention to provide an improved system for lifting and transporting stacks of ferromagnetic plates.

Another object is the provision of such an improved system for lifting and transporting stacks of ferromagnetic plates that overcomes the above-given disadvantages, in particular that uses two or more magnet assemblies, and that is very reliable.

A further object is to provide a method and a system using magnet assemblies having only electromagnets or electromagnets combined with permanent magnets, by means of which energy for gripping, lifting, and transporting may be saved while maintaining necessary safety aspects.

SUMMARY OF THE INVENTION

A stack of ferromagnetic sheets is gripped, lifted, and transported by first engaging with an uppermost sheet of the stack a plurality of magnet assemblies of a magnetic grab, each assembly having at least one electromagnet, then electrically energizing the electromagnets and lifting the stack with the grab while monitoring a magnetic flux of each electromagnet. A controller then compares the fluxes of the electromagnets, and varies the electrical energization of at least one of the electromagnets such that the fluxes of all the electromagnets are generally equal. According to the invention the system has at least one flux sensor on each of the magnet assemblies and connected to the controller.

The substantial central idea of the method or system is not to merely activate the different magnet assemblies of a magnetic grab in the same manner as has been the case according to prior art, but to actually measure the magnetic flux at each of the individual magnet assemblies and thus obtain information o exactly what the magnetic holding force is at the magnet assembly being monitored.

For this purpose it is assumed as an established fact that the magnetic flux can be detected by standard measurement technology, such as by at least one sensing coil at each magnet assembly, particularly at least at one of the pole shoes of each of the magnet assemblies, and by detecting and integrating the induced voltage with the changes of the magnetic field, and further the fact that the magnetic holding force is approximately dependent on the square of the magnetic flux.

Therefore, the method or system according to the invention ensures that information on the magnetic flux, and thus the magnetic holding force is present in each magnet assembly, so that the invention may compare each of the measured values, for example, with predetermined target values, and adjust them in case of any deviations. For this purpose the invention may further provide that during different handling steps, such as during gripping, or during lifting and transporting, other target values apply. According to a preferred embodiment of the invention the fluxes of all magnet assemblies are made to conform to each other. In this manner it may be assumed after each resetting that the holding forces are equal at each magnet assembly within the measuring tolerances.

For this purpose resetting may be done, for example, in that the magnetic flux of each of the magnet assemblies is measured and the biggest flux is determined from the measurement values. Once aware of the biggest flux in one of the magnet assemblies, the other magnet assemblies may then be reset such that their magnetic fluxes are increased until they equal this biggest flux. For example, the magnetic flux determined in this manner may form a target value, to which the fluxes of all magnet assemblies can be adjusted.

To this end it is deemed as particularly advantageous, if in a further improvement of the method or system the magnetic flux of each magnet assembly is continuously measured and feed-back controlled during the entire time of the lifting of the ferromagnetic object until it is set down.

For this purpose the continuous determination during the entire time is of particular advantage, since different stresses may act upon the magnet assembly during movement of the load, e.g. the ferromagnetic object, such as due to its inertia that has the effect that during the dynamic lifting, e.g. in an acceleration and movement phase, the holding forces must generally be greater in order to bring about safe holding during this phase, than with the static lifting, when the ferromagnetic object is not moved.

As stated above, the invention may therefore provide that the value to which the magnetic flux is adjusted at each magnet assembly, particularly in consideration of the conforming in the individual phases between the gripping and the depositing of the at least one ferromagnetic object, may be different, for example, also with an acceleration of the at least one ferromagnetic object when lifting the same toward the top, wherein a greater magnetic flux is selected, than with a translation of the at least one ferromagnetic object while maintaining a certain height.

Due to the dynamic adjustment of a flux to be adjusted at the individual magnet assemblies, energy may be saved without neglecting any safety aspects while carrying out the method as opposed to commonly known methods in which a magnetic flux, having a safety margins that is much too high is constantly adjusted.

For this purpose the invention may also provide that movement and/or acceleration sensor is provided on a magnetic grab that detects the movement or acceleration and modifies the magnetic grab, particularly the individual magnet assemblies, with regard to the magnetic flux as a function of these values. To this end, for example, a signal of such a sensor can be analyzed by a controller, and the magnetic flux of each magnet assembly can be adjusted. Such a sensor may be used in order to modify the target values stated above.

In general, or in particular, the invention may provide in connection with such a sensor controller as stated above that the flux of all magnet assemblies is adjusted to a value that is greater than equal to a required safety value. Based on the above mentioned embodiments the safety value, which may correspond to the target value, may be variable, particularly variable or dependent upon the movement situations of the at least one ferromagnetic object.

For this purpose it is conceived as particularly advantageous, if a safety value is determined individually with each transport for the at least one ferromagnetic object to be transported. In this manner it must be determined that as described below the precise magnetic holding forces present are dependent upon the acting magnetic resistances, which are present in the magnetic circuits of each magnet assembly. Since the magnetic resistances differ from ferromagnetic object to ferromagnetic object, an optional safety value will also change from ferromagnetic object to ferromagnetic object. However, the method according to the invention provides to determine the safety value individually for a ferromagnetic object to be transported, or for an arrangement of multiple ferromagnetic objects to be simultaneously transported, such as a stack of multiple flat sheets, particularly before a lifting occurs for the transport.

One embodiment may provide that the safety value is determined as a function of a minimum measured magnetic flux that is required I order to lift the at least one ferromagnetic object. For such a measurement all magnet assembly may be activated in the same manner, or adjusted to the same holding force or flux.

In this manner a lower threshold value of the magnetic flux may be determined, below which the lifting of a ferromagnetic object is not possible, however, the lifting of the at least one ferromagnetic object is possible with the setting of a magnetic flux above the minimal measured value.

It may then be provided that the safety value is the result of the determined, minimal required flux; multiplied by a safety factor. The safety factor in turn may be variable, as mentioned above, or may be set differently, such as for the different movement situations of the at least one ferromagnetic object.

In a particular embodiment, in which the invention provides to lift a stack of multiple flat sheets, the magnetic flux is reduced in a further improvement of the method after lifting a stack of multiple flat sheets in order to bring about that at least the lowest held flat sheet is separated from the stack and drops.

The process step is based on the consideration that based on the magnet assembly the magnetic flux must act through the individual flat sheets and up to the lowest flat sheet such that the lowest flat sheet from such a held stack visibly adheres to the stack at the lowest holding force, and thus the risk for the lowest of multiple flat sheets is highest in that the same is separated from the stack, therefore representing a significant risk potential.

The method according to the invention ensures that with a reduction of the holding force at least the lowest flat sheet is separated, thus eliminating the risk described above.

In order to achieve the separation of the lowest, or optionally also of multiple lower sheets from the stack in a safe and controlled manner a further improvement may provide that the magnetic flux of at least one outer, or based on the flat sheet, of a magnet assembly close to the edge, is reduced, for example, while maintaining the magnetic flux of the remaining magnet assemblies.

This means that the holding force is decreased in an outer area; particularly an area of the flat sheet that is close to the edge, such that such a flat sheet is not abruptly separated from the stack overall, but starting at one side is slowly separated from the stack by peeling.

An alternative may also provide that the magnetic flux of at least one outer magnet assembly is reduced in a stronger manner, than the magnetic flux of the remaining magnet assemblies. For this purpose the magnetic flux of all magnet assemblies is reduced as opposed to previous embodiments, however, that of the outer magnet assemblies, particularly the ones close to the edge, is reduced in a stronger manner.

Both embodiments cause a peeling of the flat sheet, which may, for example, be guided through from a low height after gripping such a stack.

The invention therefore provides to increase the magnetic flux again after the reduction of the magnetic flux mentioned above of at least one outer magnet assembly, at least to the original value, however, in a preferred embodiment even beyond the same.

It is therefore possible in turn to determine a safety value as a value of the magnetic flux measured of at least one magnet assembly at the time of the at least lowest flat sheet dropping, to which the magnetic flux of all magnet assemblies is adjusted, particularly in turn under the aspect of the adjustment of the magnetic fluxes of all magnet assemblies among each other. The safety value in turn may form a target value for regulating each individual magnet assembly.

For example, the safety value in this case may also result from the use of a safety factor in multiplication with the magnetic flux on at least one of the magnet assemblies measured at the time of the dropping, such as the magnet assembly that had the lowest magnetic flux of all at the time of the dropping.

In a possible embodiment the invention may provide to at least double the magnetic flux, thus at least quadrupling the holding force due to the square connection. In this manner, for example, the requirements of government safety organizations may be met, which require that a ferromagnetic object, or a stack of such, e.g. for example a stack of flat sheets, is held using at least triple the safety. The triple safety is undoubtedly achieved, if the magnetic flux is doubled based on a magnetic flux at the time of the lower sheet fall off from a sheet stack.

Based on the aspects of the method described above the invention may provide that a conforming of the magnetic fluxes of all magnet assemblies is carried out each time after a modification of the magnetic flux on at least one of the magnet assembly occurs.

For example, this occurs directly after a phase of lifting a stack, in order to initially obtain a uniform base situation for the holding force on all magnet assemblies. In the next case, for example, after the separating of at least one lower sheet has occurred from a stack. For this purpose the conforming is carried out particularly after setting the magnetic fluxes to the safety value discussed above. A conforming of the magnetic fluxes during the situation however, in which at least the lowest flat sheet is to separate from a stack, is unnecessary, since the situation is knowingly brought on by the different activation of the magnet assemblies.

The conforming, and particularly also the adjustment to a value that is at least equal or greater than the previously mentioned safety value may then also be carried out in the various movement phases in order to ensure that both in case of a uniform and accelerated movement of the magnetically carried ferromagnetic objects the same always safely adhere to the magnetic grabs.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
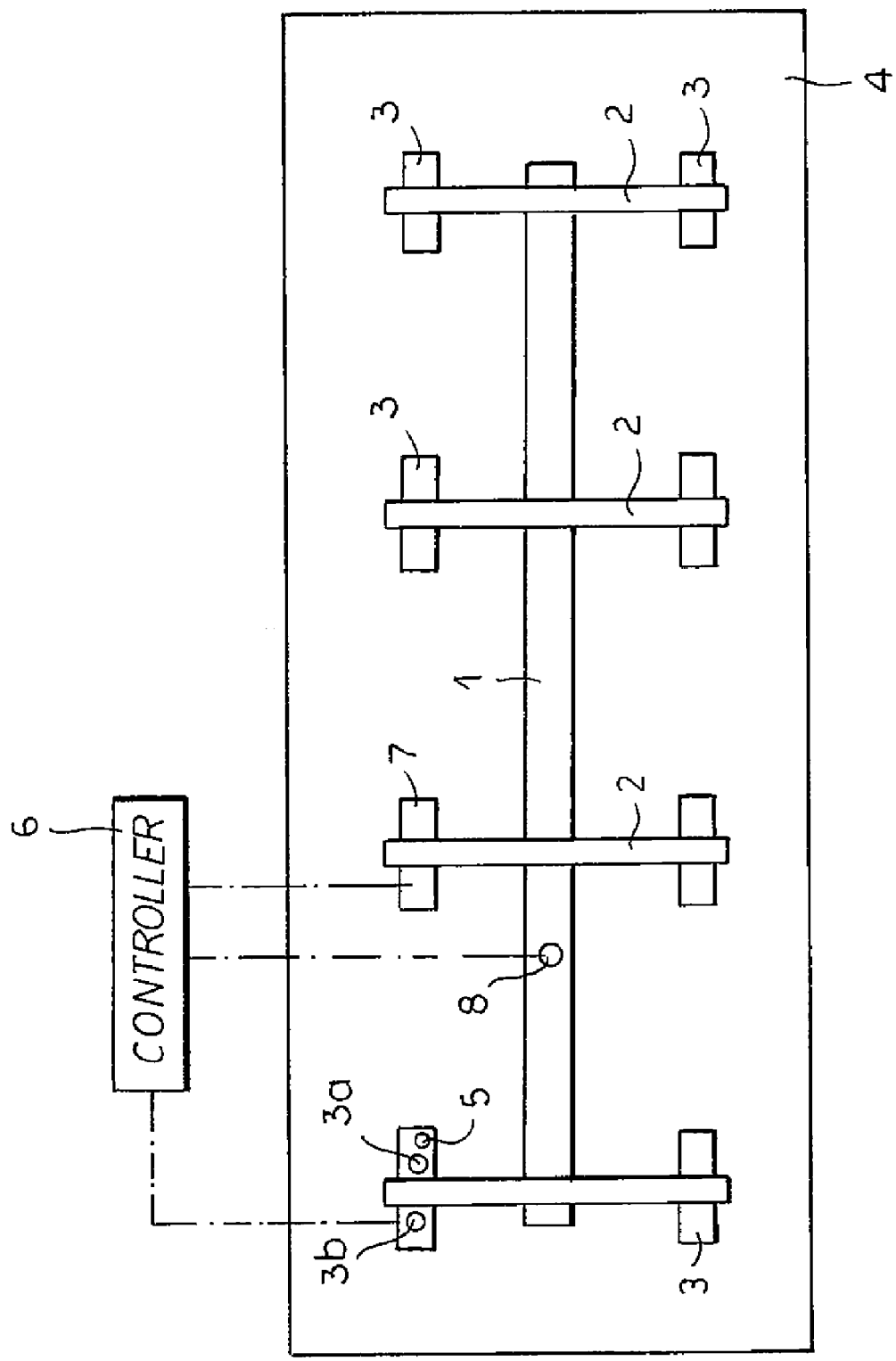
FIG. 1 is a partly schematic top view of a magnetic transport system according to the invention.

As seen in FIG. 1 a magnetic grab has a longitudinal beam 1 on which cross beams 2 are mounted at equal spacings, extending perpendicular from the beam 1. The cross beams 2 project transversely past the longitudinal beam 1 on both sides substantially by the same distance. A magnet assembly 3 is mounted on each end of each cross beam 2, and has a permanent magnet 3a and an electromagnet 3b. Purely electromagnetic magnet assemblies may also be provided, as well as bistable systems, or other magnet assemblies available on the market.

FIG. 1 further shows that a total of eight magnet assemblies 3 are provided that form a rectangular array. Each magnet assembly in turn forms a pair of pole shoes between which the magnetic field lines extend through a plate stack 4 to be carried, thus forming a closed magnetic circuit. Instead of the rectangular configuration shown, any other arrangement of the magnet assemblies 3 would also be possible. Each of the assemblies 3 also has a flux sensor 5 in addition to the respective permanent magnet 3a and electromagnet 3b. The electromagnets 3b are powered by a controller 6 that is also connected to the sensors 5.

Figure 2:
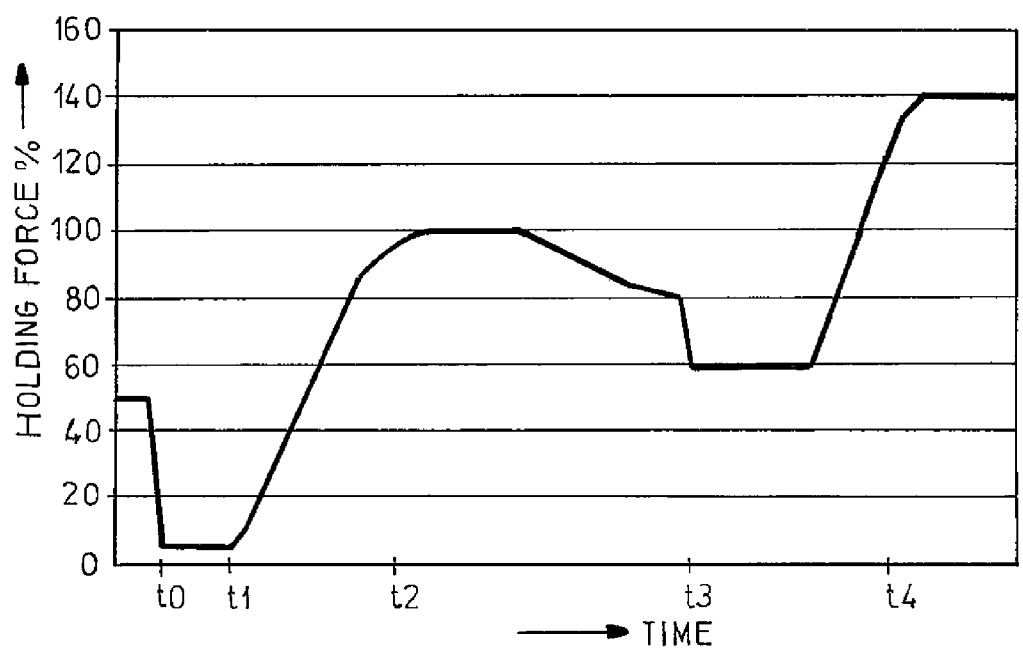
FIG. 2 is a graph illustrating operation of the system of this invention.

FIG. 2 is a graph illustrating a method according to the invention. The holding force is illustrated by way of example only in percent of one of the magnet assemblies. Since the holding force is proportional to flux, the measurement and illustration of the holding force selected in FIG. 2 is equivalent to a measurement and illustration of the magnetic flux.

For this purpose the invention provides that the holding force illustrated herein is set at least once, preferably several times during movement of the sheet metal in the individual magnet assemblies 3. The setting is not illustrated in detail in the Figures, and is carried out by the controller 6 taking into account outputs of the sensors 5.

It is obvious that in order to carry out the method according to the invention in a preferred embodiment for lifting multiple sheets current measurements for the holding force are initially set at a time t0 in order to obtain a defined base condition. After resetting, the magnetic grab, for example having multiple magnet assemblies 3 such as described in FIG. 1, may be set down on the upper face of the top sheet of the plate stack 4.

According to the invention the holding force is increased at time t1, such as by changing the current level of the electromagnets of the individual magnet assemblies 3. For example, in combination of permanent and electromagnets the current feed of the electromagnets may be such that the holding force generated by the permanent magnet become effective. Optionally, the current feed may be reversed in order to increase the effective holding force beyond that of the permanent magnets alone. Overall, the invention provides for the method according to the invention to carry out the current feed such that the desired effective magnetic fluxes or holding forces are achieved with the magnet assemblies 3, whether they are purely electromagnetic or combinations of permanent and electromagnet assemblies, as illustrated in FIG. 2.

Figure 3A:
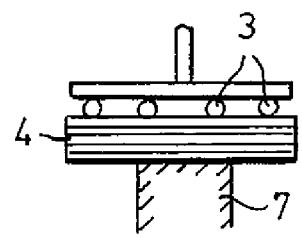
FIGS. 3A-3D are a small-scale side view illustrating the steps of this invention.
Figure 3B:
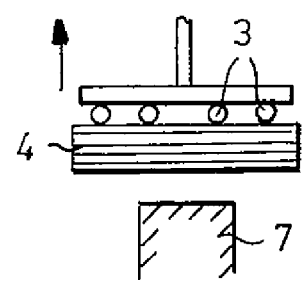

Thus as shown in FIG. 3A, the grab rests the magnets 3 atop the stack 4 which may be sitting on a support or just form a certain number of sheets atop a tall pile of sheets. The stack 4 is then lifted as shown in FIG. 3B a short distance off this support 7.

Figure 3C:
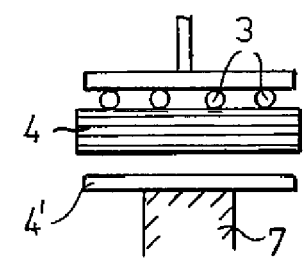

FIG. 2 further shows that after the time t2, at which, for example, an initial setting of the holding forces of the individual magnetic forces may have already occurred, the holding force is reduced until a lowermost sheet 4' of the stack has separated from the stack 4 and drops completely as shown in FIG. 4C' or partially as shown in FIG. 4C". This can be seen at the time t3, at which the holding force is reduced, in the present case, from 100% to 60%. Here, it may also be provided to carry out a conforming of the holding forces or of the magnetic fluxes of the individual magnet assemblies 3 according to the invention at or after the time t3. The sheet 4; can either be completely dropped from the stack as shown in FIG. 3C', or only an end one of the magnets 3 can have its flux reduced so that the sheet 4' peels off at the one end.

After the complete or partial separation of the lowest sheet 4', which takes place at flux level that is clearly somewhat unsafe, the magnetic holding force is increased starting at the time of the lowering of the prevalent holding force at the time t4, particularly in this case to slightly double the same from 60% to 140%.

Figure 3D:
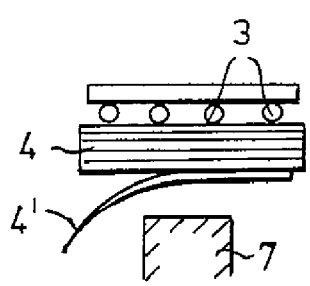
Figure 3D:
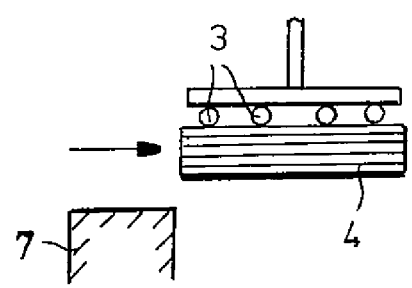

In this manner a holding force is provided that suffices to transport the plate stack suspended from the magnetic grab at a sufficient safety margin, as after the time t3 after the loss of the lowest sheet the remaining sheets are held with a force that is significantly, for example 1.5 times, over a minimum force for holding. Due to the slightly more than doubling a holding force is therefore achieved in this example from the time t4 on that is, for example, higher than the magnetic force by a factor 3, thus fulfilling all safety requirements. The stack 4 is carried safely away as shown in FIG. 3D, with no chance of sheets dropping off it.

It is also possible to provide the grab with a motion/acceleration sensor 8 coupled to the controller 6. In this manner the fluxes can be increased when the load is accelerating or decelerating or moving rapidly, as during such times vibration and inertia can loosen the grip of the magnets 3 on the stack 4.

For this purpose according to the invention after the time t4 the holding forces or magnetic fluxes are monitored and continuously reset during the subsequent transport, right up to the time the stack 4 is set down and released by cutting the total flux of each magnet assembly 3 to zero. This can be done in a system with permanent and electromagnets by reversing the energization of the electromagnets so they cancel out the fields of the respective permanent magnets.

It should be noted that the instant invention is not limited by the precisely stated percentage of the holding forces given above. They merely serve for illustrating the method. Only the qualitative course of the holding forces is important in this regard.

In summary it may be noted that the method according to the invention provides a particularly safe method or system for transporting plate stacks both by individually monitoring and setting the holding forces or of the magnetic fluxes in each of the individual magnet assembly and also specifically in the carrying out of the method according to the invention for transporting plate stacks and separating at least the lowermost plate, since the definitive exceeding of the holding forces equipped with a safety margin may be ensured at each time of the movement of such a plate stack

We claim:

1. A method of gripping, lifting, and transporting a stack of ferromagnetic sheets, the method comprising the steps of sequentially:
   a) engaging with an uppermost sheet of the stack a plurality of magnet assemblies of a magnetic grab, each assembly having at least one electromagnet;
   b) electrically energizing the electromagnets;
   c) monitoring a magnetic flux of each electromagnetic;
   d) comparing the fluxes of the electromagnets; and
   e) varying the electrical energization of at least one of the electromagnets such that the fluxes of all the electromagnets are generally equal.

2. The method defined in claim 1, further comprising the step after step e) of
   f) lifting and transporting the stack by raising and moving the grab while continuing to monitor and compare the fluxes and vary the electrical energization so as to maintain the fluxes generally equal.

3. The method defined in claim 2, further comprising the step before step f) of:
   e') determining a minimum flux value sufficient to hold the stack; and thereafter
   e") maintaining the fluxes of all of the grabs above the minimum flux value.

4. The method defined in claim 3 wherein the minimum flux value is determined for each stack to be transported.

5. The method defined in claim 3 wherein step e') is carried out by the steps of sequentially:
   raising the entire stack a short distance;
   decreasing all of the fluxes until a lowermost sheet drops off the raised stack; and
   establishing as the minimum flux value a flux value substantially above the value of the fluxes when the lowermost sheet dropped.

6. The method defined in claim 5 wherein step e') is carried out by the steps of sequentially:
   raising the entire stack a short distance;

reducing the flux level of one magnet assembly at an end of the grab while maintaining the flux level at all the other magnetic assemblies the same until the lowermost sheet of the stack separates from the stack downward at least at the end of the grab; and establishing as the minimum flux value a flux value substantially above the value of the flux in the one assembly when the lowermost sheet separated.

7. The method defined in claim 5 wherein step e') is carried out by the steps of sequentially:

raising the entire stack a short distance;

significantly reducing the flux level of one magnet assembly at an end of the grab while reducing the flux level at all the other magnetic assemblies the same but a to a lesser extent until the lowermost sheet of the stack separates from the stack downward at least at the end of the grab; and establishing as the minimum flux value a flux value substantially above the value of the flux in the one assembly when the lowermost sheet separated.

8. The method defined in claim 5 wherein step e') is carried out by the steps of sequentially:

raising the entire stack a short distance;

rapidly reducing the flux level of one magnet assembly at an end of the grab while slowly reducing the flux level at all the other magnetic assemblies the same until the lowermost sheet of the stack separates from the stack downward at least at the end of the grab; and establishing as the minimum flux value a flux value substantially above the value of the fluxes in the other assemblies when the lowermost sheet separated.

9. The method defined in claim 1 further comprising the step of providing a flux sensor in each of the magnet assemblies and using it to monitor the flux of the respective magnet assembly.

10. The method defined in claim 1 wherein each of the assemblies also includes a permanent magnet.

11. The method defined in claim 1, further comprising the step while transporting the stack of:

detecting acceleration and deceleration of the load and increasing the fluxes on such acceleration and deceleration.

12. The method defined in claim 1 wherein the fluxes are varied by increasing or decreasing electrical energization of the respective electromagnets.

13. A system for gripping, lifting, and transporting a stack of ferromagnetic sheets, the system comprising:

a raisable support;

a plurality of magnet assemblies on the support each comprising at least one electromagnet and at least one flux sensor; and control means connected to each of the magnets and each of the sensors for, after engagement of the magnets with a top sheet of a stack of sheets:

electrically energizing the electromagnets, monitoring a magnetic flux of each electromagnetic, comparing the fluxes of the electromagnets, and varying the electrical energization of at least one of the electromagnets such that the fluxes of all the electromagnets are generally equal.

\* \* \* \* \*